(12) United States Patent
Sekiguchi

(10) Patent No.: US 7,453,638 B2
(45) Date of Patent: Nov. 18, 2008

(54) FRESNEL LENS SHEET, REAR PROJECTION SCREEN, AND REAR-PROJECTION-TYPE DISPLAY

(75) Inventor: Hiroshi Sekiguchi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 464 days.

(21) Appl. No.: 10/562,120

(22) PCT Filed: Apr. 25, 2005

(86) PCT No.: PCT/JP2005/007837

§ 371 (c)(1),
(2), (4) Date: Dec. 23, 2005

(87) PCT Pub. No.: WO2005/103815

PCT Pub. Date: Nov. 3, 2005

(65) Prior Publication Data

US 2007/0002439 A1 Jan. 4, 2007

(30) Foreign Application Priority Data

Apr. 26, 2004 (JP) .............................. 2004-129346

(51) Int. Cl.
*G03B 21/60* (2006.01)
*G02B 3/08* (2006.01)
(52) U.S. Cl. ...................................... 359/457; 359/742
(58) Field of Classification Search ................. 359/457, 359/742, 743, 460
See application file for complete search history.

(56) References Cited

U.S. PATENT DOCUMENTS 6,639,736 B2 * 10/2003 Watanabe et al. ........... 359/742
6,650,471 B2 * 11/2003 Doi ............................. 359/443
6,809,889 B2 * 10/2004 Tokuda et al. ............... 359/742

FOREIGN PATENT DOCUMENTS

| JP | A 61-208041 | 9/1986 |
|---|---|---|
| JP | A 03-135501 | 6/1991 |
| JP | A 08-122923 | 5/1996 |
| JP | A 2000-155203 | 6/2000 |

(Continued)

*Primary Examiner*—Christopher Mahoney
(74) *Attorney, Agent, or Firm*—Oliff & Berridge, PLC

(57) ABSTRACT

The present invention provides a Fresnel lens sheet that scarcely makes the projected image distorted, and others. The Fresnel lens sheet has a plurality of unit total reflection Fresnel lenses arranged on the light-entering side, each unit lens having a light-entering surface and a total reflection surface that totally reflects a part of or all of the imaging light that has passed through the light-entering surface to deflect the light in the desired direction. This Fresnel lens sheet is formed so that it fulfills the relationship $H_1 \times H_1/(10 \times E_1 \times T_1 \times T_1) \leq 3L/2000$, where $H_1$ represents the length (cm) in the vertical direction of the Fresnel lens sheet; $L_1$, the length (cm) in the horizontal direction of the Fresnel lens sheet; $T_1$, the thickness (cm) of the Fresnel lens sheet; and $E_1$, the modulus of elasticity (kgf/cm$^2$) of the Fresnel lens sheet. Further, by using, to make up the Fresnel lens sheet, a Fresnel-lens-molded sheet having unit total reflection Fresnel lenses and a backing sheet laminated to the light-emerging surface of the Fresnel-lens-molded sheet, improvement in the efficiency of mold releasing operation that is conducted in the production of the Fresnel lens sheet is achieved.

17 Claims, 9 Drawing Sheets

FOREIGN PATENT DOCUMENTS

| | | |
|---|---|---|
| JP | A 2000-214533 | 8/2000 |
| JP | A 2000-221603 | 8/2000 |
| JP | A 2001-075178 | 3/2001 |
| JP | A 2002-107835 | 4/2002 |
| JP | A 2002-264148 | 9/2002 |
| JP | A 2003-084111 | 3/2003 |
| JP | A 2003-177475 | 6/2003 |
| JP | A 2003-177477 | 6/2003 |
| JP | A 2003-313445 | 11/2003 |
| JP | A 2004-093847 | 3/2004 |
| JP | A 2004-093918 | 3/2004 |

\* cited by examiner

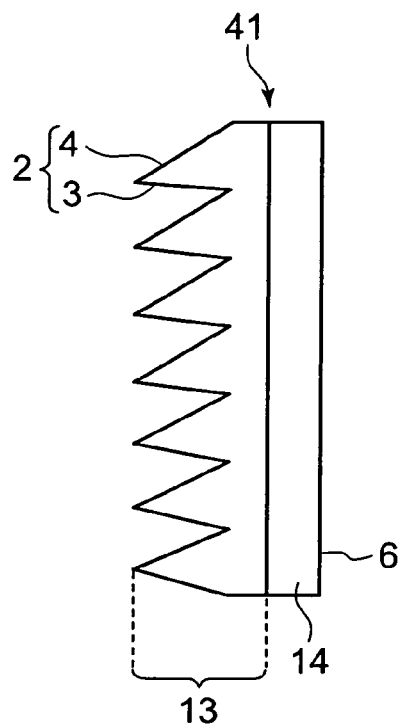
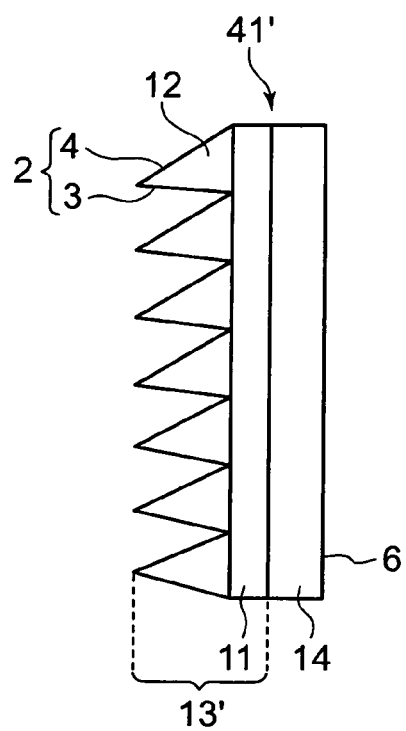
FIG. 13A  FIG. 13B
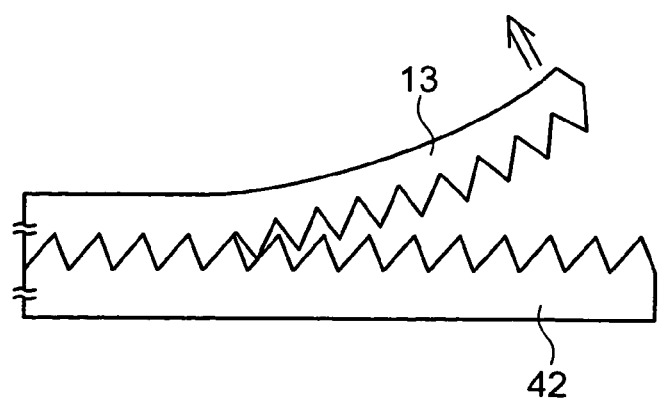
FIG. 14

FRESNEL LENS SHEET, REAR PROJECTION SCREEN, AND REAR-PROJECTION-TYPE DISPLAY

BACKGROUND OF THE INVENTION

1. Field of the Invention

The present invention relates to a Fresnel lens sheet that scarcely makes the projected image distorted, to a rear projection screen, and to a rear-projection-type display.

2. Background Art

A projection television, or a rear-projection-type display, comprises a rear projection screen on which imaging light from a light source that has been spread is projected. This rear projection screen is usually composed of: a Fresnel lens element for refracting the imaging light from the light source that has been spread and projected on the Fresnel lens element, to make the light parallel or almost parallel and emitting this light toward the viewer side; and a lenticular lens element for scattering the parallel or almost parallel light emerging from the Fresnel lens element to provide an image to viewers who are in a wide area. Although a CRT light source of three-tube type by which light of three primary colors are projected from three different tubes has been usually used as the light source in a rear-projection-type display of the above-described type, a light source of single-tube type, using an LCD or DLP, has come to be used as well in recent years.

As shown in FIG. 16, the mode of a conventional rear-projection-type display 52 has generally been that imaging light 5 emitted from a single-tube-type light source 8 is made to reflect from a mirror 53 and then to enter a rear projection screen 10 vertically or almost vertically to its center. Therefore, as shown in FIG. 17, the position of the rear projection screen 10 has not affected the projected image whether the screen is brought near or moved away from the light source 8 in the direction in which the imaging light 5 is incident on the rear projection screen 10.

Rear-projection-type displays that are made much thinner than ever by letting the imaging light 5 enter the rear projection screen 10 obliquely to its center have been proposed in recent years. Namely, there has been proposed a mode that the imaging light 5 emitted from the light source 8 is made to reflect from the mirror 53 and then to enter the rear projection screen 10 obliquely to its center, like in a rear-projection-type display 51 shown in FIG. 5. In the rear projection screen 10 contained in such a rear-projection-type display 51, it has been proposed to use a Fresnel lens sheet (see FIG. 12B) having a Fresnel lens of total reflection type (total reflection Fresnel lens) (see Japanese Laid-Open Patent Publication No. 208041/1986, for example).

DISCLOSURE OF THE INVENTION

In the rear-projection-type display 51 as is shown in FIG. 5 (a flat panel display of rear projection type 51 in which the imaging light 5 is made to enter the rear projection screen 10 obliquely to its center), the Fresnel lens sheet contained in the rear projection screen 10 is incorporated in the display with its periphery supported by a frame, and the four sides of the Fresnel lens sheet are thus maintained on one plane. Therefore, the Fresnel lens sheet sometimes undergoes deflection under a load of the Fresnel lens sheet itself. If the rear projection screen 10 sustains bulging or lifting as a result of this deflection of the Fresnel lens sheet, the position of the Fresnel lens on the Fresnel lens sheet shifts closer to or away from the light source 8 (in the direction of the thickness of the sheet). For this reason, the position of the image that is displayed around the center of the Fresnel lens sheet is to vary in the direction of height. Further, for example, when the Fresnel lens sheet undergoes deflection, although a portion of the Fresnel lens that is in the center of the Fresnel lens sheet gets out of position in the direction of the thickness of the sheet, a portion of the Fresnel lens that is in the periphery of the Fresnel lens sheet does not get out of position so much, so that the image displayed on the rear projection screen undergoes distortion. For example, when a straight-line image extending horizontally is displayed on the rear projection screen, this straight-line image sometimes appears curved relative to the horizontal direction.

In particular, since a recent demand on rear-projection-type displays is to make them thinner than ever, the angle at which imaging light is incident on the center of a Fresnel lens sheet having a total reflection Fresnel lens tends to become greater. It is, therefore, anticipated that the problem that the image displayed on the rear projection screen gets distorted will be more significant. However, the fact is that no consideration has so far been given to this problem at all.

Further, the above-described Fresnel lens sheet having a total reflection Fresnel lens is produced by the steps of: filling a Fresnel-lens-sheet-forming flat mold with a molding resin; curing the molding resin in the mold; and then releasing the Fresnel lens sheet from the mold. The problem with the production of the Fresnel lens sheet having a total reflection Fresnel lens, in particular, has been that: since the Fresnel lens element of the Fresnel lens sheet 1 as is, for example, shown in FIG. 12B (in which unit total reflection Fresnel lenses 2, each unit lens composed of a light-entering surface 3 and a total reflection surface 4, are inclined at a predetermined angle in the direction of incidence of the imaging light 5) and the mold (not shown in the figure) are meshing with each other, it is very difficult to release the Fresnel lens sheet from the mold because the Fresnel lens sheet is less flexible when it is thick. For this reason, in addition to the above-described demand for a Fresnel lens sheet that scarcely makes the projected image distorted, there is a strong demand for a Fresnel lens sheet that can improve the efficiency of mold releasing operation that is conducted in the production of the Fresnel lens sheet.

The present invention has been accomplished under these circumstances. A first object of the present invention is to provide a Fresnel lens sheet that scarcely makes the projected image distorted, and a rear projection screen and a rear-projection-type display that comprise such a Fresnel lens sheet.

A second object of the present invention is to provide a Fresnel lens sheet not only fulfilling the above-described first object but also making it possible to improve the efficiency of mold releasing operation that is conducted in the production of the Fresnel lens sheet, and a rear projection screen and a rear-projection-type display that comprise such a Fresnel lens sheet.

The inventor has made earnest studies in order to overcome the above-described problems, and, as a result, has found the permissible level of deflection of Fresnel lens sheets at which no troubles are practically caused, as well as the relationship, necessary to attain this level, between the size (the length in the vertical direction×the length in the horizontal direction) and the thickness of the Fresnel lens sheet and the physical value (modulus of elasticity) of the Fresnel lens sheet. The present invention has been accomplished on the basis of this finding.

Namely, a Fresnel lens sheet of the present invention for fulfilling the above-described first object comprises unit total reflection Fresnel lenses arranged on the light-entering side, each unit total reflection Fresnel lens having a light-entering surface and a total reflection surface that totally reflects a part of or all of the imaging light that has passed through the light-entering surface to deflect the light in the desired direction, and is characterized by fulfilling the relationship: $H \times H/(10 \times E \times T \times T) \leqq 3L/2000$, where H represents the length (cm) in the vertical direction of the Fresnel lens sheet; L, the length (cm) in the horizontal direction of the Fresnel lens sheet; T, the thickness (cm) of the Fresnel lens sheet; and E, the modulus of elasticity (kgf/cm$^2$) of the Fresnel lens sheet. In this Specification, the modulus of elasticity is given in kgf/cm$^2$; 1 kgf/cm$^2$ is nearly equal to 9.8 N/cm$^2$.

In the case where the Fresnel lens sheet is single-layer one composed of a total reflection Fresnel lens, this lens sheet fulfills the relationship: $H_1 \times H_1/(10 \times E_1 \times T_1 \times T_1) \leqq 3L_1/2000$, where $H_1$ represents the length (cm) in the vertical direction of the Fresnel lens sheet; $L_1$, the length (cm) in the horizontal direction of the Fresnel lens sheet; $T_1$, the thickness (cm) of the Fresnel lens sheet; and $E_1$, the modulus of elasticity (kgf/cm$^2$) of the Fresnel lens sheet.

When the Fresnel lens sheet is combined-type one composed of a base and a Fresnel lens element formed on the base, this lens sheet fulfills the relationship: $H_2 \times H_2/(10 \times E_2 \times T_2 \times T_2) \leqq 3L_2/2000$, where $H_2$ represents the length (cm) in the vertical direction of the base; $L_2$, the length (cm) in the horizontal direction of the base; $T_2$, the thickness (cm) of the base; and $E_2$, the modulus of elasticity (kgf/cm$^2$) of the base.

Since the Fresnel lens sheet of the present invention fulfills the above-described relationship, it hardly undergoes deflection and therefore scarcely makes the projected image distorted. Moreover, since it is possible to set the size and the thickness of the Fresnel lens sheet according to the material to be used to form the Fresnel lens sheet, or select the material for the Fresnel lens sheet with consideration for the size and the thickness of the Fresnel lens sheet, so that the Fresnel lens sheet fulfills the above relationship, significant reduction in design or production costs can be expected.

A Fresnel lens sheet of the present invention for fulfilling the above-described second object is characterized by comprising a Fresnel-lens-molded sheet having the above-described unit total reflection Fresnel lenses, and a backing sheet laminated to the light-emerging surface of the Fresnel-lens-molded sheet.

According to this Fresnel lens sheet of the present invention, since a Fresnel-lens-molded sheet and a backing sheet are used to make up the Fresnel lens sheet, the Fresnel-lens-molded sheet can be made thinner. It is therefore possible to release, with ease, the Fresnel-lens-molded sheet that is thin and soft from a mold with a molding surface in the transferred shape of the Fresnel lens, and thus possible to improve the efficiency of the production of the Fresnel lens sheet. Moreover, the Fresnel lens sheet, as a whole, fulfills the above-described relationship. Therefore, it becomes possible to provide a Fresnel lens sheet that hardly undergoes deflection and scarcely makes the projected image distorted, and that can improve the efficiency of mold releasing operation.

In the Fresnel lens sheet of the present invention, it is preferable that the backing sheet be a lenticular lens sheet having lenticular lenses. In this case, it is possible to produce, at extremely high efficiency, a Fresnel lens sheet integrally composed of a Fresnel-lens-molded sheet and a lenticular lens sheet.

Further, in the Fresnel lens sheet of the present invention, it is preferable that the material for the Fresnel-lens-molded sheet and that for the backing sheet be the same. In this case, since the Fresnel-lens-molded sheet and the backing sheet are made from the same material, the Fresnel lens sheet hardly undergoes deflection and thus scarcely makes the projected image distorted. Consequently, it becomes possible to provide a Fresnel lens sheet having a minimized tendency to lose its flatness.

Furthermore, in the Fresnel lens sheet of the present invention, it is preferable that the Fresnel lens sheet contains a light-diffusing agent for diffusing light, or that the Fresnel lens sheet be colored so that it absorbs light, or that the Fresnel lens sheet has a light-absorbing layer for absorbing light. In this case, stray light which a Fresnel lens sheet having a total reflection Fresnel lens tends to produce can be either diffused or absorbed, so that it is possible to solve the dual image problem that is caused by the stray light. As a result, the projected image scarcely gets distorted, and dual images hardly occur.

Furthermore, in the Fresnel lens sheet of the present invention, it is preferable that a reflectance-lowering layer for lowering reflectance be formed on one surface or both surfaces of the Fresnel lens sheet. In this case, it is possible to prevent lowering of image contrast that is caused by reflected light.

A rear projection screen of the present invention may be composed of the above-described Fresnel lens sheet alone, or composed of the above-described Fresnel lens sheet and lenticular lenses for diffusing light, formed on the light-emerging surface of the Fresnel lens sheet. Moreover, a rear projection screen of the present invention may also be formed by placing a lenticular lens sheet having lenticular lenses for diffusing light on the light-emerging side of the above-described Fresnel lens sheet. Thus, there is provided a rear projection screen comprising both a Fresnel lens element and a lenticular lens element.

In the rear projection screen of the present invention, it is preferable that a reflectance-lowering layer for lowering reflectance be formed on one surface or both surfaces of the rear projection screen. In this case, it is possible to prevent lowering of image contrast that is caused by reflected light.

A rear-projection-type display of the present invention is characterized by comprising the above-described rear projection screen, and a light source from which imaging light is obliquely incident on the rear projection screen.

As explained above, the Fresnel lens sheet and the rear projection screen according to the present invention scarcely make the projected image distorted. Further, it is possible to set the size and the thickness of the Fresnel lens sheet according to the material to be used to form the Fresnel lens sheet, or to select the material for the Fresnel lens sheet with consideration for the size and the thickness of the Fresnel lens sheet, so that the Fresnel lens sheet fulfills the above-described relationship. Significant reduction in design or production costs can therefore be expected.

Further, according to the Fresnel lens sheet and the rear projection screen of the present invention, a Fresnel-lens-molded sheet and a backing sheet may be used to make up the Fresnel lens sheet, so that the Fresnel-lens-molded sheet can be made thinner. It is, therefore, possible to easily release the Fresnel-lens-molded sheet that is thin and soft from the mold with a molding surface in the transferred shape of the Fresnel lens. Consequently, not only the above-described effects can be obtained, but also improvement in the efficiency of the production of the Fresnel lens sheet can be achieved.

Furthermore, according to the rear-projection-type display of the present invention, since the display comprises the Fresnel lens sheet of the present invention that scarcely makes the projected image distorted, it becomes possible to make the display significantly thinner.

BRIEF DESCRIPTION OF THE DRAWINGS

FIGS. 13A and 13B are cross-sectional views showing Fresnel lens sheets according to further embodiments of the present invention.

FIG. 14 is an illustration for explaining the step of releasing, from a mold, a Fresnel-lens-molded sheet that the Fresnel lens sheet shown in FIG. 13A or 13B comprises.

BEST MODE FOR CARRYING OUT THE INVENTION

Figure 1:
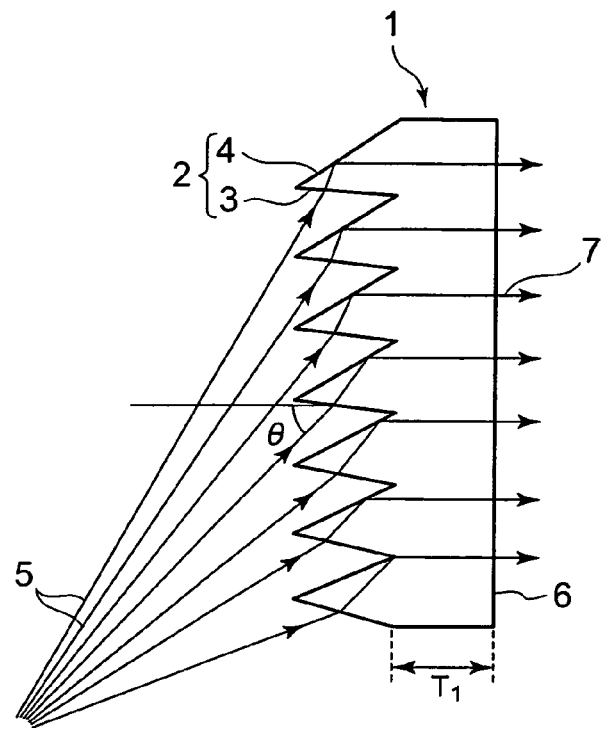
FIG. 1 is a cross-sectional view showing an example of the Fresnel lens sheet according to an embodiment of the present invention (a single-layer Fresnel lens sheet having a total reflection Fresnel lens).

Embodiments of a Fresnel lens sheet, a rear projection screen, and a rear-projection-type display according to the present invention will be described hereinafter with reference to the accompanying drawings. In the drawings, various components are depicted exaggeratedly in terms of shape, dimensions, etc. in order to facilitate the understanding of the invention.

(Basic Structure of Fresnel Lens Sheet)

First of all, the basic structure of a Fresnel lens sheet according to the present invention will be described.

A Fresnel lens sheet according to the present invention is for refracting imaging light from a light source that has been spread and projected on the Fresnel lens sheet, to make the light parallel or almost parallel and emitting this light toward the viewer side. The Fresnel lens sheet has a plurality of unit total reflection Fresnel lenses 2 arranged on the light-entering side, each unit lens having a light-entering surface 3 and a total reflection surface 4 that totally reflects a part of or all of the imaging light 5 that has passed through the light-entering surface 3 to deflect the light in the desired direction, like a Fresnel lens sheet 1 shown in FIG. 1. Although the Fresnel lens sheet 1 shown in FIG. 1 is single-layer one composed of a total reflection Fresnel lens 2, the present invention includes a combined-type Fresnel lens sheet composed of a base 11 and a Fresnel lens element 12 formed on the base 11, like a Fresnel lens sheet 1' shown in FIG. 2.

Figure 2:
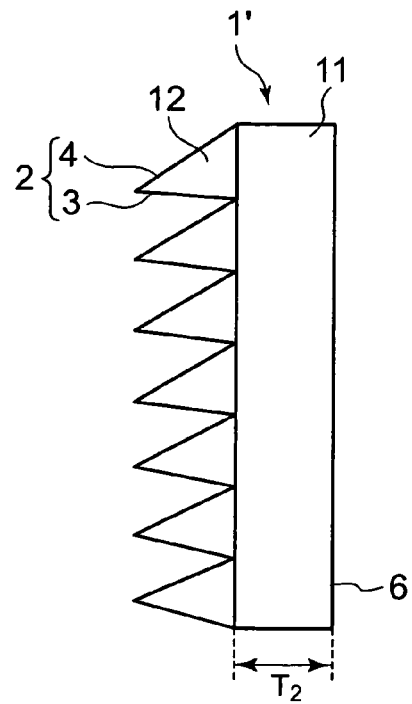
FIG. 2 is a cross-sectional view showing an example of the Fresnel lens sheet according to another embodiment of the present invention (a combined-type Fresnel lens sheet composed of a base and a Fresnel lens element formed on the base).

The characteristic feature of the present invention is that these Fresnel lens sheets 1 and 1' fulfill the relationship $H \times H/(10 \times E \times T \times T) \leq 3L/2000$, where H represents the length (cm) in the vertical direction of the Fresnel lens sheet 1 or of the base 11; L, the length (cm) in the horizontal direction of the Fresnel lens sheet 1 or of the base 11; T, the thickness (cm) of the Fresnel lens sheet 1 or of the base 11; and E, the modulus of elasticity (kgf/cm$^2$) of the Fresnel lens sheet 1 or of the base 11. In this Specification, the characteristic values of the Fresnel lens sheet 1 in the embodiment shown in FIG. 1 are denoted by $H_1, L_1, T_1$, and $E_1$, while those of the base 11 in the embodiment shown in FIG. 2 are denoted by $H_2, L_2, T_2$ and $E_2$.

Since the Fresnel lens sheets 1 and 1' according to the present invention fulfill the relationship $H \times H/(10 \times E \times T \times T) \leq 3L/2000$, they undergo no deformation (deformation due to deflection or bending) to such an extent that the imaging light 7(see FIG. 1) that has passed through the Fresnel lens sheet 1 or 1' gets distorted. Consequently, even in the case where the angle θ at which imaging light 5 is incident on the center of the Fresnel lens sheet 1 or 1' is great, the imaging light 7 that has passed through the Fresnel lens sheet 1 or 1' does not get significantly distorted. The Fresnel lens sheets 1 and 1' of the present invention can therefore contribute to the recent efforts to make rear-projection-type displays smaller in thickness and better in quality. On the other hand, when the Fresnel lens sheet 1 or 1' fulfills the relationship $H \times H/(10 \times E \times T \times T) > 3L/2000$, it can undergo deformation (deformation due to deflection or bending) to such an extent that the imaging light 7 that has passed through the Fresnel lens sheet 1 or 1' gets distorted.

As a result, the imaging light that has passed through the Fresnel lens sheet 1 or 1' can get significantly distorted.

The reason why $H \times H/(10 \times E \times T \times T) \leq 3L/2000$ has been established as the relationship that the Fresnel lens sheets 1 and 1' according to the present invention have to fulfill will now be described in detail.

In general, rear-projection-type display screens diagonally measure about 50 inches (aspect ratio 4:3, 76.2 cm long by 101.6 cm broad) or more. Therefore, even if the image projected on the screen in such a size gets distorted, viewers not always recognize that the image is distorted, depending on the degree of distortion of the image.

Figure 3:
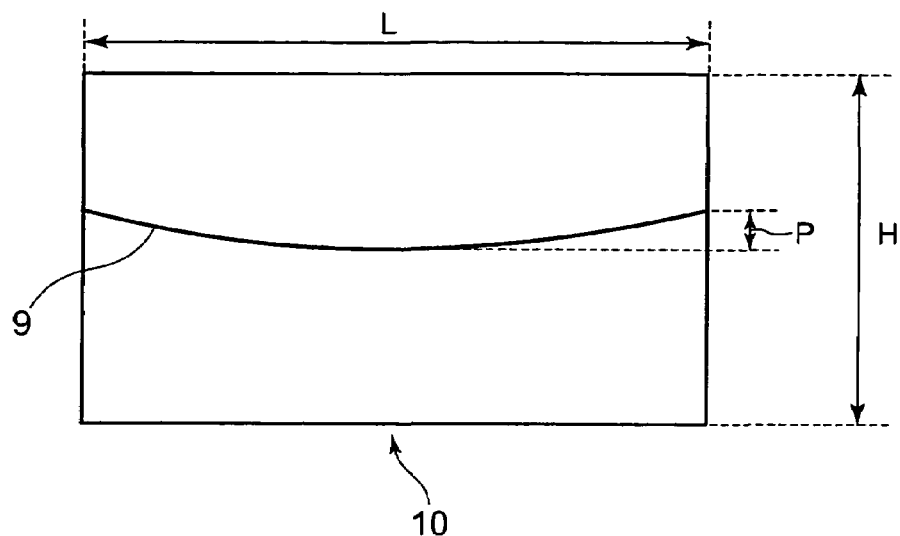
FIG. 3 is a diagrammatic view for explaining the distortion of an image (the bending of a straight line) that occurs when a straight-line image extending horizontally is projected on a rear projection screen comprising a Fresnel lens sheet according to the present invention.

Namely, an actual Fresnel lens sheet that constitutes a rear projection screen is placed in and supported by a U-shaped frame, and the four sides of the Fresnel lens sheet are held on one plane. The Fresnel lens sheet can undergo deflection under a load of the Fresnel lens sheet itself, and its flatness thus lowers. The expression "to undergo deflection" herein means that the center of the Fresnel lens sheet gets out of position in the direction vertical to the screen (in the direction of the normal to the screen). When such a shift occurs, the image displayed on the screen undergoes a change in position in the direction of height (in the vertical direction). Since the frame supports the Fresnel lens sheet, the outer edge (periphery) of the Fresnel lens sheet does not get out of place and the image undergoes no change in position in the direction of height. Therefore, in the case where an image of a straight line 9 extending horizontally is displayed on a rear projection screen 10, when the Fresnel lens sheet undergoes deflection, the straight line appears curved and the image gets distorted, as shown in FIG. 3. The inventor has thoroughly examined such image distortion in terms of a variety of images, and has found that the permissible limit of image distortion is approximately 3/1000 of the unit length. For example, the inventor has found the following: when an image of a horizontal straight line 9 is displayed on the rear projection screen 10, as shown in FIG. 3, if the length of the straight line 9 is equal to the length L (cm) in the horizontal direction of the rear projection screen 10, it is quite hard for viewers to recognize the bend P of the straight line 9 as long as the bend P is not more than 3/1000 of L (=3L/1000) upwardly or downwardly.

Figure 6:
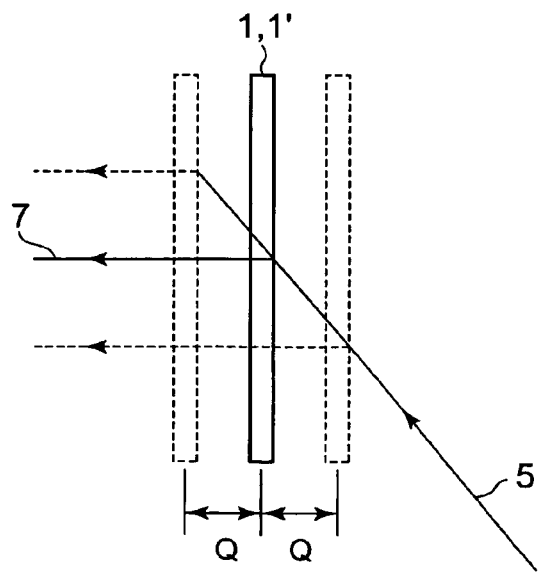
FIG. 6 is a diagrammatic view for explaining a change in the position of an image that is caused in a flat panel display of rear projection type comprising a Fresnel lens sheet (rear projection screen) according to the present invention, by a change in the position of a Fresnel lens.

On the other hand, in the latest flat panel displays of rear projection type in which imaging light is incident on the Fresnel lens sheet obliquely to its center, the angle θ at which the imaging light is incident on the center of the Fresnel lens sheet is from 60 to 65°. According to our knowledge, in such a flat panel display of rear projection type, if it is tried to suppress image distortion to such an extent that the bend P of the straight line 9 is not more than 3L/1000 upwardly or downwardly, the distance Q (see FIG. 6) that is the permissible limit for the deflection, in the direction of thickness, of the Fresnel lens sheet is 3/2000 of L or less.

Figure 4:
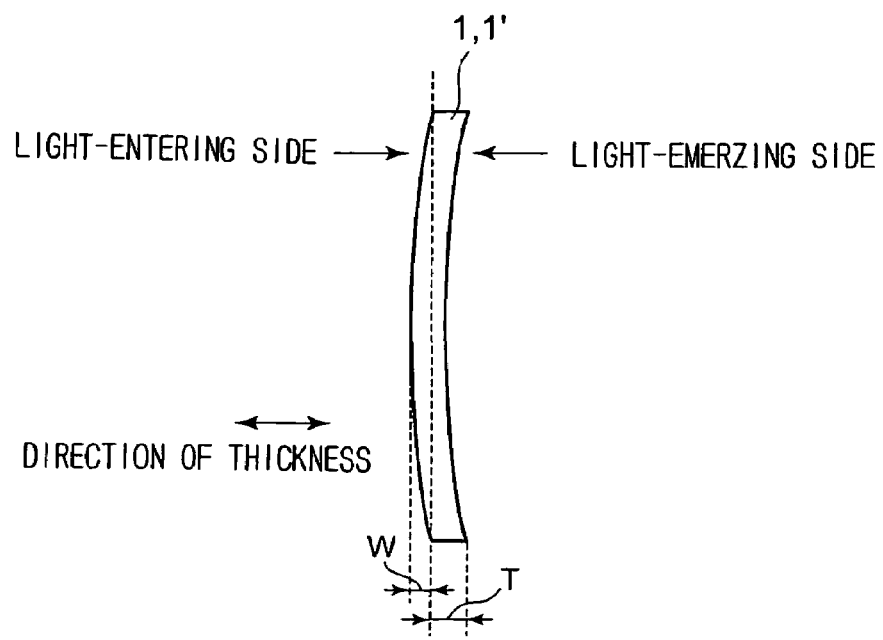
FIG. 4 is a diagrammatic view for explaining deflection that a Fresnel lens sheet according to the present invention undergoes.

Therefore, in order to obtain an image whose distortion is unnoticeable, it is proper to control the amount of deflection W (see FIG. 4) of the Fresnel lens sheet 1, 1' to 3L/2000 or less.

The inventor has then made intensive studies in order to obtain a Fresnel lens sheet that does not undergo deflection in an amount of more than 3L/2000.

When a Fresnel lens sheet is placed in and held by a frame, the amount of deflection of the Fresnel lens sheet is determined by the modulus of elasticity E of the Fresnel lens sheet, and the size (height H and width L) and the thickness T of the Fresnel lens sheet. Of these, the size of the Fresnel lens sheet includes two parameters, height H and width L. However, in the case of screens, the height H to width L ratio is limited only to two of 4:3 and 16:9, so that, of the two parameters, the height H can be adopted as a parameter of the amount of deflection.

The inventor has measured the amounts of deflection of Fresnel lens sheets different in size, thickness, and modulus of elasticity, placed in U-shaped frames, and thoroughly studied the measured values in order to clarify the relationship between the above-described parameters and the amount of deflection. As a result, the inventor has found that, when a Fresnel lens sheet undergoes deflection in an amount of as small as 0.1 to 0.3 cm, the amount of deflection W is nearly equal to $H \times H/(10 \times E \times T \times T)$. As is clear from the above studies, since the permissible amount of deflection is 3L/2000 or less, the relationship that the Fresnel lens sheets 1 and 1' have to fulfill is $H \times H/(10 \times E \times T \times T) \leq 3L/2000$.

In the above description, the length in the vertical direction $H_1$ of the Fresnel lens sheet 1 shown in FIG. 1 is defined as the lengthwise width of the Fresnel lens sheet 1, and the length in the vertical direction $H_2$ of the base 11 of the Fresnel lens sheet 1' shown in FIG. 2 is defined as the lengthwise width of the base 11. Further, the length in the horizontal direction $L_1$ of the Fresnel lens sheet 1 shown in FIG. 1 is defined as the crosswise width of the Fresnel lens sheet 1, and the length in the horizontal direction $L_2$ of the base 11 of the Fresnel lens sheet 1' shown in FIG. 2 is defined as the crosswise width of the base 11. Furthermore, the thickness $T_1$ of the Fresnel lens sheet 1 shown in FIG. 1 is defined as the thickness of the Fresnel lens sheet 1 excluding the Fresnel lens element (see FIG. 1), and the thickness $T_2$ of the base 11 of the Fresnel lens sheet 1' shown in FIG. 2 is defined as the thickness of the base 11 itself (see FIG. 2). In the above-described relationship, the reason why the thickness T is defined as the thickness of the Fresnel lens sheet 1 excluding the Fresnel lens element or of the base 11 itself of the Fresnel lens sheet 1' shown in FIG. 2 is that: since the Fresnel lens element has a thickness of only 1/10 or less of that of the Fresnel lens sheet excluding the Fresnel lens element, it scarcely affects the deflection of the Fresnel lens sheet 1 or 1'.

The modulus of elasticity $E_1$ of the Fresnel lens sheet 1 shown in FIG. 1 is defined as the modulus of elasticity of the Fresnel lens sheet 1, and the modulus of elasticity $E_2$ of the base 11 of the Fresnel lens sheet 1' shown in FIG. 2 is defined as the modulus of elasticity of the base 11. Further, as will be described later, in the case were the Fresnel lens sheet comprises a backing sheet laminated to the other sheet (see FIGS. 13A and 13B), when these sheets are made from the same material, the modulus of elasticity of either the backing sheet or the other sheet such as the base is defined as the modulus of elasticity of this Fresnel lens sheet.

In the case where the backing sheet and the other sheet such as the base are made from different materials, when it is assumed that the rigidity of the entire Fresnel lens sheet is attributed to the backing sheet, the modulus of elasticity E is defined as the modulus of elasticity of the backing sheet. On the other hand, when it is assumed that the rigidity of the entire Fresnel lens sheet is attributed to both the backing sheet and the other sheet such as the base, the modulus of elasticity E is defined as the mean of the modulus of elasticity of the backing sheet and that of the base or of the other sheet other than the base. The case where the rigidity of the entire Fresnel lens sheet is attributed to the backing sheet is a case where the thickness of the backing sheet is 80% or more of the total thickness of the Fresnel lens sheet, for example. In this case, the other sheet such as the base has almost no influence on the rigidity of the entire Fresnel lens sheet. On the other hand, the case where the rigidity of the entire Fresnel lens sheet is attributed to both the backing sheet and the other sheet such as the base is a case where the thickness of the backing sheet is less than 80% of the total thickness of the Fresnel lens sheet. Namely, when the thickness of the backing sheet is less than 80% of the total thickness of the Fresnel lens sheet, the other sheet such as the base has influence on the rigidity of the entire Fresnel lens sheet. In this case, it is preferable to take, as the modulus of elasticity of the Fresnel lens sheet, the mean of the modulus of elasticity of the backing sheet and that of the other sheet such as the base.

In the case where the base 11, the backing sheet, or the like of the Fresnel lens sheet 1 shown in FIG. 1 or of the Fresnel lens sheet 1' shown in FIG. 2 is made from one material without additional ingredients, the modulus of elasticity E of the base 11, the backing sheet, or the like designates the modulus of elasticity of this material. On the other hand, when the base 11, the backing sheet, or the like contains a diffusing agent or other ingredients, it is preferable that a measured value of the modulus of elasticity of the Fresnel lens sheet 1, the base 11, the backing sheet, or the like be taken as the modulus of elasticity E. The modulus of elasticity is measured in accordance with "JIS K 7113: Testing Method for Tensile Properties of Plastics", using specimens taken from the Fresnel lens sheet 1, the base 11, the backing sheet, or the like.

As described above, the Fresnel lens sheets 1 and 1' according to the present invention fulfill the relationship H×H/(10× E×T×T)≦3L/2000, where H represents the length (cm) in the vertical direction of the Fresnel lens sheet 1 or of the base 11; L, the length (cm) in the horizontal direction of the Fresnel lens sheet 1 or of the base 11; T, the thickness (cm) of the Fresnel lens sheet 1 or of the base 11; and E, the modulus of elasticity (kgf/cm$^2$) of the Fresnel lens sheet 1 or of the base 11. Therefore, the Fresnel lens sheets 1 and 1' do not undergo deformation (deformation due to deflection or bending) to such an extent that the imaging light 7 that has passed through the Fresnel lens sheet 1 or 1' gets distorted. Consequently, even in the case where the angle θ at which imaging light 5 is incident on the center of the Fresnel lens sheet 1 or 1' is great, the imaging light 7 that has passed through the Fresnel lens sheet 1 or 1' does not get significantly distorted. The Fresnel lens sheets 1 and 1' can, therefore, contribute to the recent efforts to make rear-projection-type displays smaller in thickness and better in quality.

Specific embodiments of the Fresnel lens sheets having the above-described structures will be described hereinafter.

First Embodiment

First of all, a Fresnel lens sheet according to the first embodiment of the present invention will be described.

As shown in FIG. 1, a Fresnel lens sheet 1 according to the first embodiment of the present invention has a single layer structure and is composed of a total reflection Fresnel lens 2. Namely, the Fresnel lens sheet 1 is single-layer one having a plurality of integrally formed unit total reflection Fresnel lenses 2 arranged on the light-entering side, each unit lens having a light-entering surface 3 and a total reflection surface 4 that totally reflects a part of or all of the imaging light 5 that has passed through the light-entering surface 3 to deflect the light in the desired direction, and fulfills the above-described relationship.

A transparent resin selected from styrene resins, acryl-styrene copolymer resins, polycarbonate resins, etc. is preferably used to form the Fresnel lens sheet 1. The Fresnel lens sheet 1 is produced by molding the above resin by press molding, injection molding, cast molding, or the like, using a mold with a molding surface in the reverse shape of the Fresnel lens.

Although a homogeneous resin containing no additional ingredients may be used as the above-described transparent resin, it is preferable to employ any of a variety of means for preventing occurrence of stray light.

Figure 7:
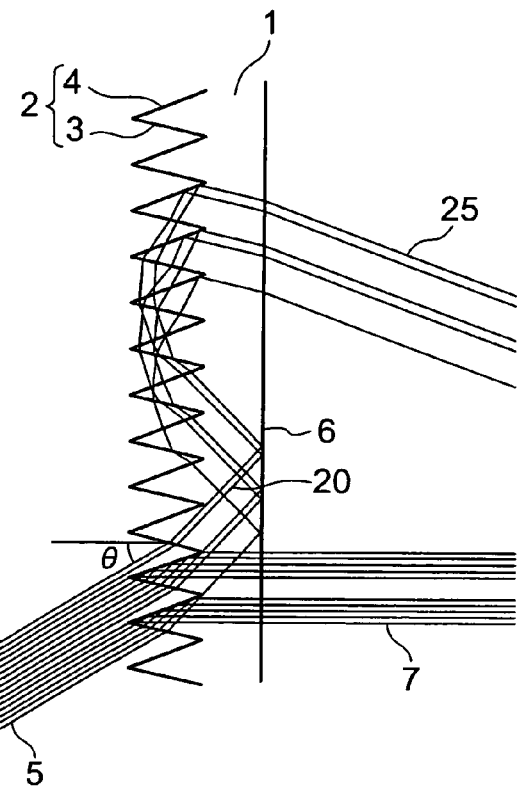
FIG. 7 is a light-ray-tracing view for explaining stray light that a Fresnel lens sheet produces.

Stray light that occurs in the Fresnel lens sheet 1 will now be described. As shown in FIG. 7, of the imaging light 5 incident on the light-entering surfaces 3 of the unit total reflection Fresnel lenses 2, the light that does not enter the total reflection surfaces 4 produces stray light 20. Further, this stray light 20 occurs when the angle θ at which the imaging light 5 is incident on the Fresnel lens sheet 1 is small, and tends to be produced around the lower end of the Fresnel lens sheet 1. The stray light 20 that has occurred in the Fresnel lens sheet 1 is reflected from the light-emerging surface 6, re-enters the Fresnel lens element (the unit total reflection Fresnel lenses 2), is refracted repeatedly, and finally emerges from the Fresnel lens sheet 1. The points on the Fresnel lens sheet 1 from which the light 25 emerges are different from those points from which the normal imaging light 7 emerges after being reflected from the total reflection surfaces 4. Such a difference between the points of emergence of light is a cause of dual images.

In such a Fresnel lens sheet 1, it is preferable to prevent, by any of the following means, occurrence of dual images due to stray light.

Figure 8A:
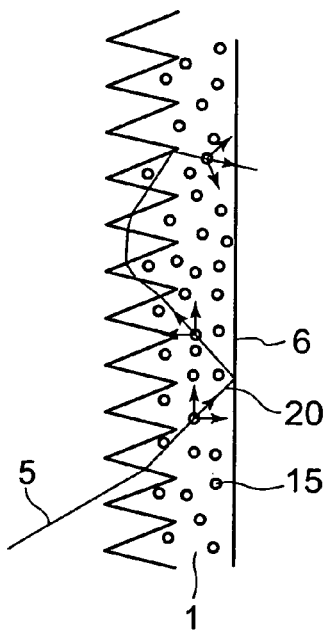
FIG. 8A is a cross-sectional view showing an example of the embodiment in which a Fresnel lens sheet according to the present invention contains a diffusing agent for diffusing light.

A first means is that a diffusing agent for diffusing light is incorporated in the Fresnel lens sheet 1. FIG. 8A shows an example of the embodiment in which the Fresnel lens sheet 1 contains a diffusing agent 15 for diffusing light. The diffusing agent 15 is selected according to the type of the resin to be used to form the Fresnel lens sheet 1, with consideration for the difference in refractive index between the diffusing agent and the resin. Examples of the diffusing agent 15 include: organic fine particles such as fine particles of styrene resins, silicone resins, acrylic resins, and MS resins; and inorganic fine particles such as fine particles of barium sulfate, glass, aluminum hydroxide, calcium carbonate, silica (silicon dioxide), and titanium oxide. One type or two or more types of these fine particles are incorporated into the resin. The fine particles may be in any of various shapes, and perfectly spherical, roughly spherical, or amorphous particles may be used, for example. In such a Fresnel lens sheet 1, stray light 20 with a long optical path length travels while being refracted repeatedly. Such stray light 20 is, however, diffused by the diffusing agent 15 contained in the Fresnel lens sheet 1, so that the dual images produced appear unclear.

Figure 8B:
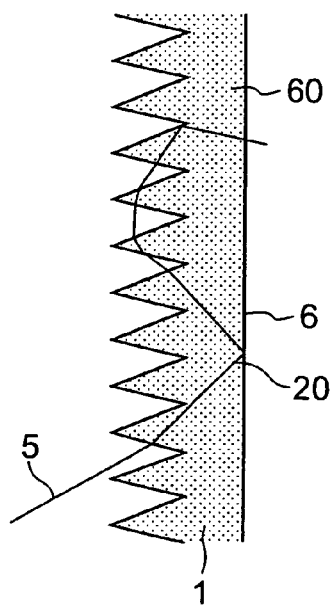
FIG. 8B is a cross-sectional view showing an example of the embodiment in which a Fresnel lens sheet according to the present invention is colored so that it absorbs light.

A second means is that the Fresnel lens sheet 1 is colored so that it can absorb light. FIG. 8B shows an example of the embodiment in which the Fresnel lens sheet 1 has been colored so that a coloring agent 60 absorbs light. Examples of the coloring agent 60 include black dyes, black pigments, and carbon black. Specific methods of coloring include a method in which a mixture of the coloring agent 60 and a resin is subjected to cast molding or extrusion. Stray light 20 with a long optical path length is greatly absorbed in such a colored Fresnel lens sheet 1 as compared with imaging light 7 with a short optical path length that emerges, as designed, from the Fresnel lens sheet 1. The dual images produced thus appear unclear.

Figure 9:
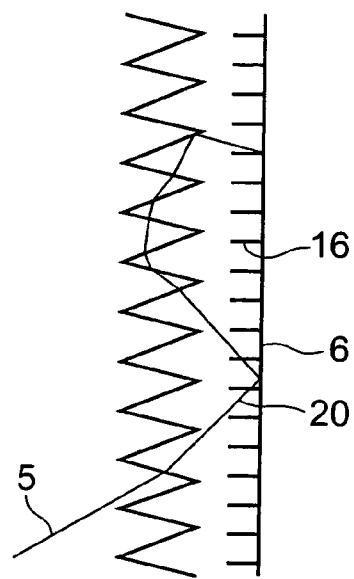
FIG. 9 is a cross-sectional view showing an example of the embodiment in which a Fresnel lens sheet according to the present invention has a light-absorbing layer that absorbs light.

A third means is that a light-absorbing layer for absorbing light is formed on the Fresnel lens sheet 1. FIG. 9 shows an example of the embodiment in which the Fresnel lens sheet 1 has a light-absorbing layer 16 for absorbing light. The light-absorbing layer 16 includes slots extending inward from the light-emerging surface 6 of the Fresnel lens sheet 1. Such a light-absorbing layer 16 is formed in the following manner: thin slots with a thickness of approximately 10 μm and a depth of approximately 100 μm, for example, are formed so that they appear to be arranged at regular intervals, in parallel with the direction in which light travels, when viewed straight on from the light-emerging surface 6 side of the Fresnel lens sheet 1; and these fine slots are filled up with a black ink by wiping. In such a Fresnel lens sheet 1, since stray light 20 with a long optical path length is absorbed by the light-absorbing layer 16 provided in the Fresnel lens sheet 1, the dual images produced appear unclear.

Figure 10:
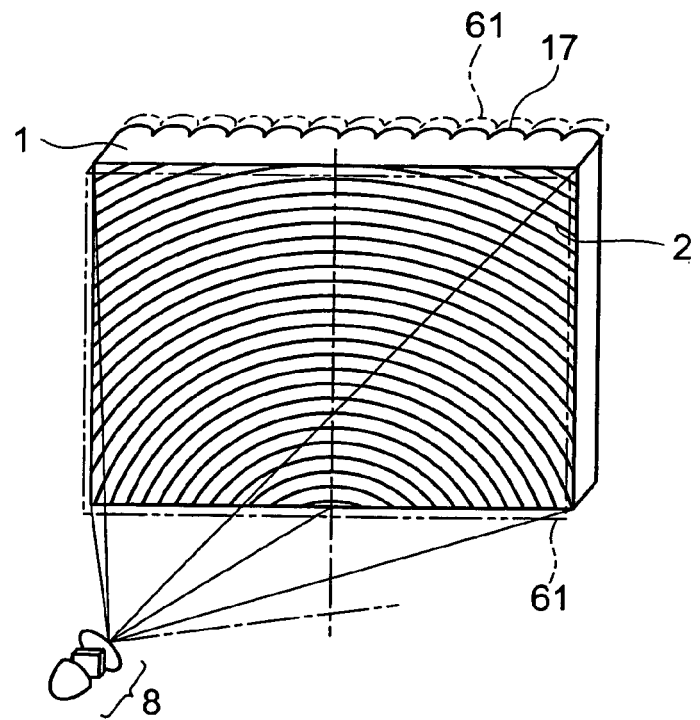
FIG. 10 is a diagrammatic view showing the embodiment in which circular (cylindrical), vertical lenticular lenses are formed on the light-emerging surface of a Fresnel lens sheet according to the present invention to make up a rear projection screen.
Figure 11:
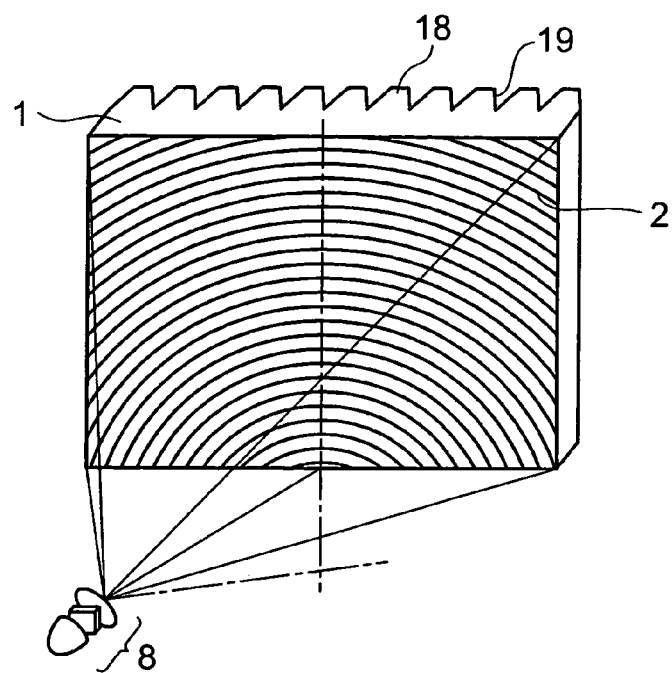
FIG. 11 is a diagrammatic view showing the embodiment in which trapezoidal (trapezoidal prismatic), vertical lenticular lenses are formed on the light-emerging surface of a Fresnel lens sheet according to the present invention to make up a rear projection screen.

A fourth means is that a lenticular lens element, louvers, or the like for diffusing light is formed on the Fresnel lens sheet 1. FIG. 10 shows the embodiment in which circular (cylindrical), vertical lenticular lenses 17 are formed on the light-emerging surface 6 of the Fresnel lens sheet 1. FIG. 11 shows the embodiment in which trapezoidal (trapezoidal prismatic), vertical lenticular lenses 18 are formed on the light-emerging surface 6 of the Fresnel lens sheet 1. In the Fresnel lens sheet 1 shown in FIG. 10, the circular, vertical lenticular lenses 17 diffuse light in the horizontal direction, and they diffuse stray light as well. The dual images produced thus appear unclear. Also in the Fresnel lens sheet 1 shown in FIG. 11, the trapezoidal, vertical lenticular lenses 18 totally reflect stray light from their slant faces 19, so that the dual images produced can be made unclear. By forming the lenticular lenses 17 or 18 on the Fresnel lens sheet 1, there can be obtained a single-layer rear projection screen. Alternatively, a two-layer, combined-type rear projection screen may be obtained by placing, on the light-emerging side (observation side) of the Fresnel lens sheet 1, a lenticular lens sheet (a lenticular lens sheet having lenticular lenses for diffusing light) that is separate from the Fresnel lens sheet 1 (see FIG. 15).

Thus, in the Fresnel lens sheet 1, the influence of the stray light produced can be minimized by using any of the above-described means.

Figures 12A, 12B:
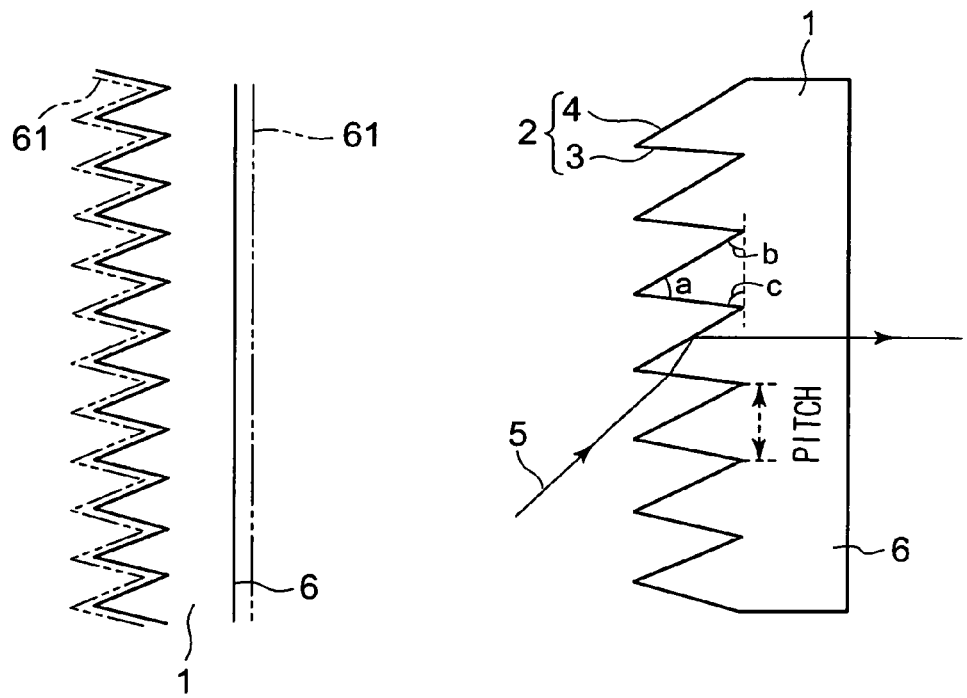
FIG. 12A is a cross-sectional view showing an example of the embodiment in which a reflectance-lowering layer for lowering reflectance is formed on the surface of a Fresnel lens sheet according to the present invention.
FIG. 12B is a cross-sectional view showing an example of the shape of a total reflection Fresnel lens that a Fresnel lens sheet according to the present invention contains.

Further, in the Fresnel lens sheet 1, a reflectance-lowering layer 61 for lowering reflectance may be formed on one surface or both surfaces of the Fresnel lens sheet 1, as shown in FIG. 12A. It is preferable to form the reflectance-lowering layer 61 by the use of a material with a low refractive index. A resin selected from fluoroplastics and silicone resins, for example, is preferably used to form this layer. To form the reflectance-lowering layer 61, any method can be used, and such a coating method as dipping or flow coating may be used. Although the reflectance-lowering layer 61 is preferably provided on the light-emerging surface 6 of the Fresnel lens sheet 1, the formation of this layer on both surfaces of the Fresnel lens sheet 1 is more effective. In such a Fresnel lens sheet 1, since the reflectance-lowering layer 61 shows the anti-reflection effect, the lowering of image contrast that is caused by the light reflected from the screen surface is suppressed. The reflectance-lowering layer 61 may be formed, in the above-described manner, also on the above-described single-layer rear projection screen composed of a Fresnel lens sheet provided with lenticular lenses, or on the two-layer, combined-type rear projection screen composed of a Fresnel lens sheet and a lenticular lens sheet (see FIGS. 10 and 15).

As mentioned previously, the Fresnel lens sheet 1 according to the first embodiment of the present invention fulfills the above-described relationship $H_1 \times H_1/(10 \times E_1 \times T_1 \times T_1) \leq 3L_1/2000$. Therefore, the Fresnel lens sheet 1 does not undergo deformation (deformation due to deflection or bending) to such an extent that the imaging light 7 that has passed through the Fresnel lens sheet 1 gets distorted. Consequently, even in the case where the angle θ at which imaging light 5 is incident on the center of the Fresnel lens sheet 1 is great, the imaging light 7 that has passed through the Fresnel lens sheet 1 does not get significantly distorted. The Fresnel lens sheet 1 can, therefore, contribute to the recent efforts to make rear-projection-type displays smaller in thickness and better in quality.

Second Embodiment

Next, a Fresnel lens sheet according to the second embodiment of the present invention will be described.

As shown in FIG. 2, a Fresnel lens sheet 1' according to the second embodiment of the present invention is of combined type and is composed of a base 11 and a Fresnel lens element 12 formed on the base 11. Namely, like in the above-described first embodiment, the Fresnel lens sheet 1' has a plurality of unit total reflection Fresnel lenses 2 arranged on the light-entering side, each unit lens having a light-entering surface 3 and a total reflection surface 4 that totally reflects a part of or all of the imaging light 5 that has passed through the light-entering surface 3 to deflect the light in the desired direction, and fulfills the above-described relationship.

A transparent resin selected from styrene resins, acryl-styrene copolymer resins, polycarbonate resins, and the like is preferably used to form the base 11 of the Fresnel lens sheet 1'. Since the Fresnel lens element 12 of the Fresnel lens sheet 1' is much thinner than the base 11, a resin selected from acrylic UV-curing resins, etc. that are generally used can be preferably used to form this element.

Namely, as shown in FIG. 2, the Fresnel lens sheet 1' is composed of the base 11 to which the rigidity of the sheet is attributed, and the Fresnel lens element 12 formed on the base 11 and having fine unit total Fresnel lenses 2, so that an ultraviolet-light-curing resin can be used to form the Fresnel lens element 12. It is, therefore, easy to form the lens, and it is possible to cut production costs.

In such a structure of the Fresnel lens sheet 1', the degree to which the Fresnel lens sheet 1' undergoes deflection is determined by the base 11, so that it is sufficient that the characteristic values of the base 11 fulfill the above-described specific relationship. Namely, since the Fresnel lens element 12 has a thickness of only 1/10 or less of that of the base 11, it scarcely affects the deflection of the Fresnel lens sheet 1'.

Also in this second embodiment, it is possible to lessen the influence of stray light or prevent lowering of contrast by incorporating a diffusing agent in the Fresnel lens sheet 1' or by forming a lenticular lens element, louvers, or the like on the light-emerging side of the Fresnel lens sheet 1', as in the above-described first embodiment.

As mentioned above, the Fresnel lens sheet 1' according to the second embodiment of the present invention fulfills the relationship $H_2 \times H_2/(10 \times E_2 \times T_2 \times T_2) \leq 3L_2/2000$. Therefore, the Fresnel lens sheet 1' does not undergo deformation (deformation due to deflection or bending) to such an extent that the imaging light 7 that has passed through the Fresnel lens sheet 1' gets distorted. Consequently, even in the case where the angle θ at which imaging light 5 is incident on the center of the Fresnel lens sheet 1' is great, the imaging light 7 that has passed through the Fresnel lens sheet 1' does not get significantly distorted. The Fresnel lens sheet 1' can, therefore, contribute to the recent efforts to make rear-projection-type displays smaller in thickness and better in quality.

Third Embodiment

Next, a Fresnel lens sheet according to the third embodiment of the present invention will be described.

As shown in FIG. 13A, a Fresnel lens sheet 41 according to the third embodiment of the present invention is of combined type and is composed of a Fresnel-lens-molded sheet 13 and a backing sheet 14 that is laminated to the light-emerging surface of the Fresnel-lens-molded sheet 13. Namely, like in the above-described first embodiment, the Fresnel lens sheet 41 has a plurality of unit total reflection Fresnel lenses 2 arranged on the light-entering side, each unit lens having a light-entering surface 3 and a total reflection surface 4 that totally reflects a part of or all of the imaging light 5 that has passed through the light-entering surface 3 to deflect the light in the desired direction, and, as a whole, fulfills the above-described relationship. The Fresnel lens sheet 41 is characterized in that the Fresnel-lens-molded sheet 13 is single-layer one composed of a total reflection Fresnel lens 2, as in the first embodiment described above.

In such a Fresnel lens sheet 41, since the Fresnel-lens-molded sheet 13 is thinner than the backing sheet 14, a transparent resin selected from styrene resins, acryl-styrene copolymer resins, polycarbonate resins, and the like is preferably used to form the backing sheet 14. And by forming the Fresnel lens sheet 41 so that the lens sheet, as a whole, fulfills the above-described relationship, it is possible to prevent distortion of the projected image and minimize the lowering of flatness.

On the other hand, since the Fresnel-lens-molded sheet 13 is thinner than the backing sheet 14, it scarcely affects image distortion, as explained in the above description of the second embodiment. Therefore, a resin selected from acrylic UV-curing resins and so on that are generally used is usually used to form the Fresnel-lens-molded sheet 13. This sheet may also be formed by the use of the same resin as that from which the backing sheet 14 is formed.

As shown in FIG. 14, the Fresnel-lens-molded sheet 13 can be obtained by molding the above-described resin by press molding, injection molding, cast molding, or the like, using a mold 42 with a molding surface in the reverse shape of the Fresnel lens, and releasing the molded resin from the mold 42.

Although transparent resins that are homogeneous and contain no additional ingredients can be used to form the Fresnel-lens-molded sheet 13 and the backing sheet 14, it is preferable to employ one of the various means described above, in order to prevent occurrence of stray light.

The Fresnel-lens-molded sheet 13 and the backing sheet 14 may be laminated to each other with an epoxy transparent adhesive or an acrylic transparent pressure-sensitive adhesive. Alternatively, the two sheets may be laminated by the application of an ultraviolet-curing resin and subsequent irradiation with UV. In this case, the thickness of the adhesive layer or that of the pressure-sensitive adhesive layer is preferably about 10 to 100 μm.

A lenticular lens sheet having lenticular lenses may be used as the backing sheet 14. By laminating the Fresnel-lens-molded sheet 13 and the backing sheet 14 in the form of a lenticular lens sheet to combine them into one, it is possible to produce, at extremely high efficiency, a Fresnel lens sheet having lenticular lenses.

The thickness of the Fresnel lens sheet 41 is required to fulfill the above-described relationship, and it is generally preferred that the thickness be from 0.2 to 0.6 cm. Further, as for the thickness of the Fresnel-lens-molded sheet 13, when the apex of the Fresnel lens element is considerably sharp and has an angle "a" of around 40° (e g., from 36 to 44°), it is generally preferred that the thickness of this sheet be from 0.05 to 0.2 cm, more preferably from 0.1 to 0.2 cm, if mold release characteristics are taken into consideration. It is generally preferred that the thickness of the backing sheet 14 be from 0.2 to 0.4 cm.

Also in this third embodiment, it is possible to lessen the influence of stray light or prevent lowering of contrast by incorporating a diffusing agent in the Fresnel lens sheet 41 or by forming a lenticular lens element, louvers, or the like on the light-emerging side of the Fresnel lens sheet 41, as in the above-described first embodiment.

As mentioned above, according to the Fresnel lens sheet 41 of the third embodiment of the present invention, the Fresnel-lens-molded sheet 13 can be made thinner, so that it is easy to release the Fresnel-lens-molded sheet 13 that is thin and soft from the mold 42 (see FIG. 14) with a molding surface in the transferred shape (reverse shape) of the Fresnel lens. It is, therefore, possible to achieve improvement in the efficiency of the production of the Fresnel lens sheet 41. Further, since the Fresnel lens sheet 41, as a whole, fulfills the above-described relationship, it becomes possible to provide a Fresnel lens sheet scarcely making the projected image distorted, capable of improving the efficiency of mold releasing operation.

Fourth Embodiment

Next, a Fresnel lens sheet according to the fourth embodiment of the present invention will be described.

As shown in FIG. 13B, a Fresnel lens sheet 41' according to the fourth embodiment of the present invention is of combined type and is composed of a Fresnel-lens-molded sheet 13' and a backing sheet 14 that is laminated to the light-emerging surface of the Fresnel-lens-molded sheet 13'. Namely, as in the above-described first embodiment, the Fresnel lens sheet 41' has a plurality of unit total reflection Fresnel lenses 2 arranged on the light-entering side, each unit lens having a light-entering surface 3 and a total reflection surface 4 that totally reflects a part of or all of the imaging light 5 that has passed through the light-entering surface 3 to deflect the light in the desired direction, and, as a whole, fulfills the above-described relationship. In the Fresnel lens sheet 41', the Fresnel-lens-molded sheet 13' is of combined type and is composed of a base 11, and a Fresnel lens element 12 formed on the base 11, as in the second embodiment described above.

Namely, as shown in FIG. 13B, this Fresnel lens sheet 41' is that the Fresnel-lens-molded sheet 13' is of combined type and is composed of the base 11 to which the rigidity of the sheet is attributed, and the Fresnel lens element 12 formed on the base hand having fine unit total reflection Fresnel lenses 2.

In such a Fresnel lens sheet 41', the Fresnel-lens-molded sheet 13' is thinner than the backing sheet 14. Moreover, in the Fresnel-lens-molded sheet 13', the Fresnel lens element 12 is formed to have a thickness considerably smaller than that of the base 11. Therefore, a transparent resin selected from styrene resins, acryl-styrene copolymer resins, polycarbonate resins, glass plates, etc. is preferably used to form the backing sheet 14. And by forming the Fresnel lens sheet 41' so that the lens sheet, as a whole, fulfills the above-described relationship, it is possible to prevent the projected image from getting distorted and minimize the lowering of the flatness of the lens sheet.

On the other hand, since the Fresnel-lens-molded sheet 13' is thinner than the backing sheet 14, it scarcely affects image distortion, as explained in the above description of the second embodiment. Therefore, a resin selected from acrylic UV-curing resins and so on that are generally used is usually used to form the Fresnel-lens-molded sheet 13'. This sheet may also be made from the same resin as that from which the backing sheet 14 is made.

Since the Fresnel-lens-molded sheet 13' is composed of the base 11 to which the rigidity of the sheet is attributed, and the Fresnel lens element 12 formed on the base 11 and having fine unit total reflection Fresnel lenses 2, an ultraviolet-curing resin may be used to form the Fresnel lens element 12. It is, therefore, easy to form the lens, and it is possible to cut production costs. Further, it is also possible to form the base 11 of the Fresnel-lens-molded sheet 13' by the use of the same resin as that from which the backing sheet 14 is made, and to form the Fresnel lens element 12 by the use of an ultraviolet-curing resin.

As shown in FIG. 14, the Fresnel-lens-molded sheet 13' is formed on the base 11 by molding a transparent resin, or a material for the Fresnel lens element 12, by press molding, injection molding, cast molding, or the like, using a mold 42 with a molding surface in the reverse shape of the Fresnel lens.

Although transparent resins that are homogeneous and contain no additional ingredients can be used to form the Fresnel-lens-molded sheet 13' (the base 11 and the Fresnel lens element 12) and the backing sheet 14, it is preferable to employ one of the various means mentioned previously, in order to prevent occurrence of stray light.

The Fresnel-lens-molded sheet 13' and the backing sheet 14 may be laminated to each other in the same manner as in the third embodiment described above. Further, as in the above third embodiment, a lenticular lens sheet having lenticular lenses may be used as the backing sheet 14 to obtain the same effects. The thickness of the Fresnel lens sheet 41', that of the Fresnel-lens-molded sheet 13', and that of the backing sheet 14 may be made the same as those in the third embodiment described above, and there can be obtained the same effects.

In such a construction of the Fresnel lens sheet 41', the degree to which the Fresnel lens sheet 41' undergoes deflection is determined by both the base 11 of the Fresnel-lens-molded sheet 13' and the backing sheet 14. It is, therefore, proper that the characteristic values of the entire Fresnel lens sheet 41' composed of the base 11 and the backing sheet 14 fulfill the above-described specific relationship of the present invention. In short, since the Fresnel lens element 12 has a thickness of only ⅒ or less of the total thickness of the Fresnel lens sheet 41', it scarcely affects the deflection of the Fresnel lens sheet 41'.

Also in this fourth embodiment, it is possible to lessen the influence of stray light or to prevent lowering of contrast by incorporating a diffusing agent in the Fresnel lens sheet 41' or by forming a lenticular lens element, louvers, or the like on the light-emerging side of the Fresnel lens sheet 41', as in the above-described first embodiment.

As mentioned above, according to the Fresnel lens sheet 41' of the fourth embodiment of the present invention, the Fresnel-lens-molded sheet 13' can be made thinner, so that it is easy to release the Fresnel-lens-molded sheet 13' that is thin and soft from the mold 42 (see FIG. 14) with a molding surface in the transferred shape (reverse shape) of the Fresnel lens. Consequently, there can be achieved improvement in the efficiency of the production of the Fresnel lens sheet 41'. Further, the Fresnel lens sheet 41', as a whole, fulfills the above-described relationship, so that it becomes possible to provide a Fresnel lens sheet scarcely making the projected image distorted, capable of improving the efficiency of mold releasing operation.

(Rear Projection Screen and Rear-Projection-Type Display)

Figure 15:
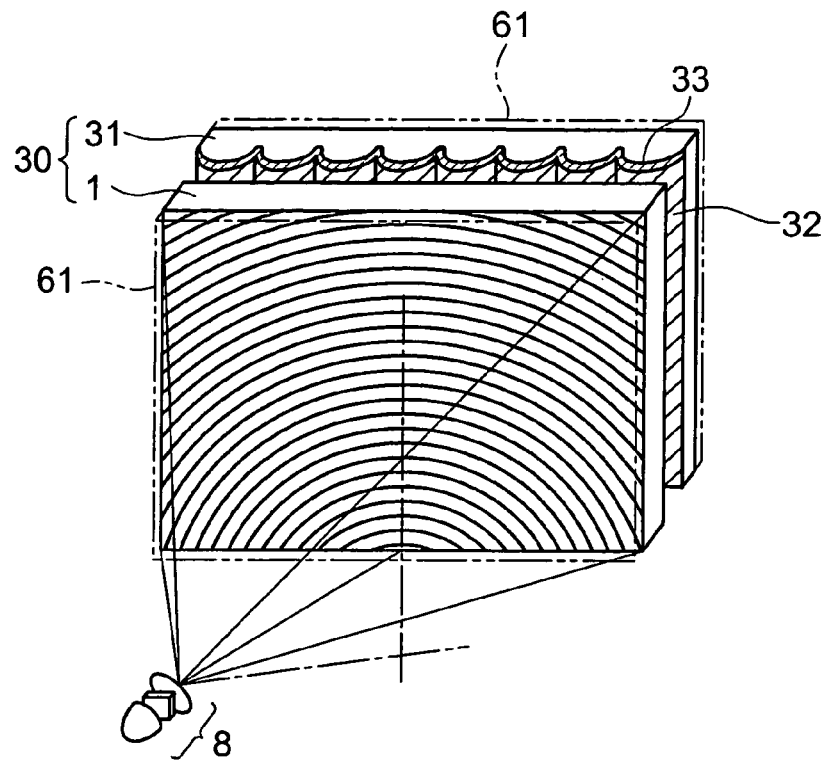
FIG. 15 is a diagrammatic view showing an example of a rear projection screen comprising a Fresnel lens sheet according to the present invention.
Figure 16:
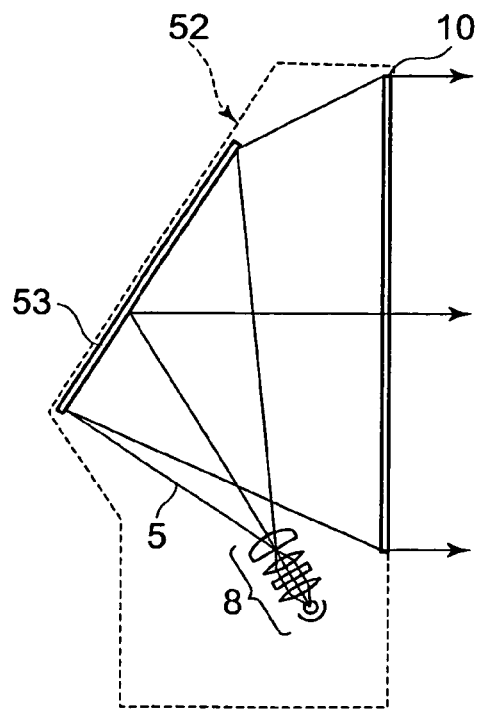
FIG. 16 is a diagrammatic view showing the structure of a conventional rear-projection-type display.
Figure 17:
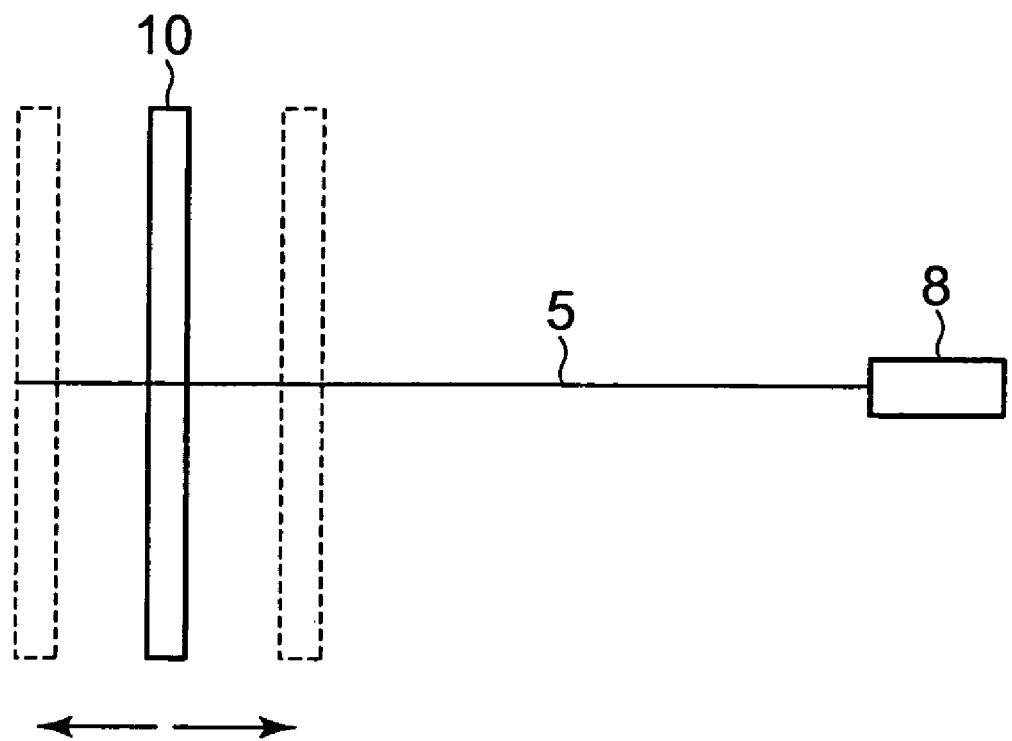
FIG. 17 is a diagrammatic view for explaining a change in the position of an image that is caused in a conventional rear-projection-type display, by a change in the position of a Fresnel lens.

The Fresnel lens sheets 1, 1', 41, and 41' according to the first to fourth embodiments described above can, by themselves, constitute single-layer rear projection screens (see FIGS. 10 and 11). Alternatively, these Fresnel lens sheets may be combined with lenticular lens sheets, thereby obtaining two-layer, combined-type rear projection screens. Specifically, as shown in FIG. 15, a rear projection screen 30 can be obtained by combining a Fresnel lens sheet 1 and a lenticular lens sheet 31, and optionally adding a front sheet or the like to this combination. The lenticular lens sheet 31 comprises vertical lenticular lenses 32, and light-absorbing layers 33 containing a light-diffusing agent, provided only on those parts extending along the lens surfaces of the vertical lenticular lenses 32. At any rate, a rear projection screen according to the present invention comprises a Fresnel lens sheet that fulfills the above-described relationship. Like in the above-described embodiments, a reflectance-lowering layer 61 may be formed also on the single-layer rear projection screen composed of a Fresnel lens sheet or on the two-layer, combined-type rear projection screen composed of a Fresnel lens sheet and a lenticular lens sheet (see FIGS. 10 and 15).

Figure 5:
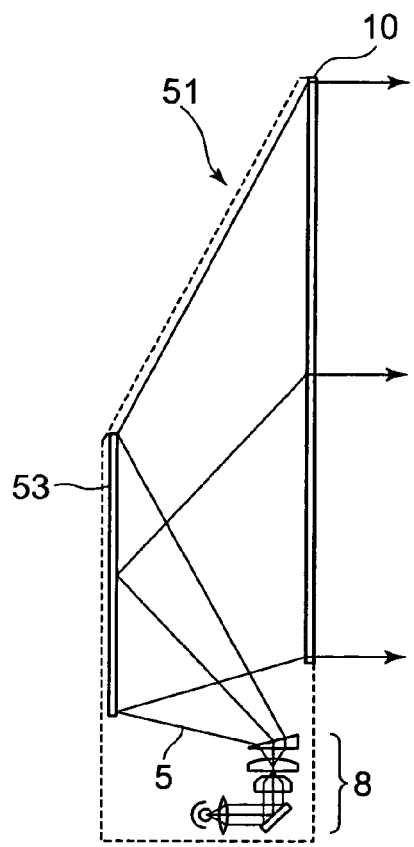
FIG. 5 is a diagrammatic view showing the structure of a flat panel display of rear projection type (using a light source of single tube type) comprising a Fresnel lens sheet (rear projection screen) according to the present invention.

Further, the rear projection screen comprising the Fresnel lens sheet 1, 1', 41, or 41' according to the first, second, third, or fourth embodiment described above can be incorporated into a rear-projection-type display 51 as is shown in FIG. 5. The rear-projection-type display 51 shown in FIG. 5 comprises a light source 8 from which imaging light 5 enters the rear projection screen 10 obliquely to its center, and it is possible to make this display considerably thinner than ever by using a mirror 53 to reflect the imaging light 5 from the light source 8 so that the reflected imaging light 5 obliquely enters the rear projection screen 10.

Some embodiments of the present invention have been described in the above. As far as the specific features of the present invention can be obtained and the initial objects of the invention can be fulfilled, any other conventionally known structure may further be added to the Fresnel lens sheets according to the above-described embodiments of the present invention, or to the aforementioned rear projection screen or rear-projection-type display.

EXAMPLES

Specific Examples of the Fresnel lens sheets according to the above-described first to fourth embodiments, of the rear projection screen, and of the rear-projection-type display will now be given hereinafter.

Example 1

A rear-projection-type display with a screen size of 50 inches (aspect ratio 16:9, 62.3 cm long by 110.7 cm broad) in which the horizontal distance between a Fresnel lens sheet and a projector (light source) was 25 cm, the vertical distance between the lower end of the screen and the horizontal plane including the projector was 17 cm, and the angle at which imaging light was incident on the center of the screen was 62.6° was prepared as a rear-projection-type display in which imaging light is obliquely projected from the rear.

An acrylic resin was used to form the Fresnel lens sheet; the thickness T of the Fresnel lens sheet was made 0.35 cm, and the lens pitch was made 0.011 cm. The modulus of elasticity of this Fresnel lens sheet was 30000 kgf/cm$^2$. The modulus of elasticity was measured in accordance with "JIS K 7113 Testing Method for Tensile Properties of Plastics". This Fresnel lens sheet contained a diffusing agent in an amount of 0.1% by weight of the total weight of the Fresnel lens sheet.

When these values are substituted in the relationship H×H/(10×E×T×T)≦3L/2000, H×H/(10×E×T×T) is equal to 0.106 and 3L/2000 is equal to 0.166, so that this relationship holds.

An excellent image without distortion was produced on the rear projection screen according to Example 1, composed of the above Fresnel lens sheet.

Further, a lenticular lens sheet separate from the Fresnel lens sheet was placed on the light-emerging side of the Fresnel lens sheet, thereby obtaining a rear projection screen (see FIG. 15). The lenticular lens sheet was composed of vertical lenticular lenses with a thickness of 0.1 cm, provided with a pitch of 0.014 cm, and light-absorbing layers containing a light-diffusing agent, provided only on those parts extending along the lens surfaces of the vertical lenticular lenses (peak gain: 4, αH: 25°, αV: 8°). The gain herein means a value obtained in the following manner: light rays are projected on the screen from its rear, and the angular distribution of luminance of the light emerging from the front face of the screen is obtained; the illuminance and the luminance on the screen are substituted in the equation: G (gain)=π×luminance (cd/cm$^2$)/illuminance (lx). The peak gain means the maximum gain of the screen, and represents herein the maximum of the gains obtained by observing the center of the screen from the front of the screen. αH denotes a half angle of the peak gain in the horizontal direction, and αV, a half angle of the peak gain in the vertical direction. An excellent image without distortion was produced also on this rear projection screen comprising the lenticular lens sheet, which was used as a separate sheet from the Fresnel lens sheet.

Example 2

A rear-projection-type display with a screen size of 60 inches (aspect ratio 16:9, 74.7 cm long by 132.8 cm broad) in which the horizontal distance between a Fresnel lens sheet and a projector (light source) was 23 cm, the vertical distance between the lower end of the screen and the horizontal plane including the projector was 20 cm, and the angle at which imaging light was incident on the center of the screen was 68° was prepared as a rear-projection-type display in which imaging light is obliquely projected from the rear.

Polycarbonate resin was used to form the Fresnel lens sheet; the thickness T of the Fresnel lens sheet was made 0.45 cm, and the lens pitch was made 0.011 cm. The modulus of elasticity of this Fresnel lens sheet was 25000 kgf/cm$^2$. The modulus of elasticity was measured in accordance with "JIS K 7113 Testing Method for Tensile Properties of Plastics". This Fresnel lens sheet contained a diffusing agent in an amount of 0.05% by weight of the total weight of the Fresnel lens sheet.

When these values are substituted in the relationship H×H/(10×E×T×T)≦3L/2000, H×H/(10×E×T×T) is equal to 0.11 and 3L/2000 is equal to 0.213, so that this relationship holds.

An excellent image without distortion was produced on the rear projection screen according to Example 2, composed of the above Fresnel lens sheet.

Further, a lenticular lens sheet separate from the Fresnel lens sheet was placed on the light-emerging side of the Fresnel lens sheet, thereby obtaining a rear projection screen. The lenticular lens sheet was composed of vertical lenticular lenses with a thickness of 0.1 cm, provided with a pitch of 0.014 cm, and light-absorbing layers containing a light-diffusing agent, provided only on those parts extending along the lens surfaces of the vertical lenticular lenses (peak gain: 4, αH: 25°, αV: 8°). An excellent image without distortion was produced also on this rear projection screen comprising the lenticular lens sheet, which was used as a separate sheet from the Fresnel lens sheet.

Example 3

In Example 3, almost the same projection system and Fresnel lens sheet as those in Example 1 were used, provided that, in Example 3, lenticular lenses were formed on the light-emerging surface of the Fresnel lens sheet. The lenticular lenses were vertical lenticular lenses with a pitch of 0.014 cm, partially including total reflection surfaces. In the lenticular lenses were incorporated a diffusing agent in such an amount that the half angle (αV) obtained from the diffusion characteristics graph would be 10°, and also a light-absorbing agent in such an amount that the transmittance would be 50%. Consequently, there was obtained a rear projection screen having the following optical properties: the peak gain=2, αH=40°, and αV=10°.

Since the above rear projection screen was of single-layer structure type, it was easy to handle this screen. Moreover, an excellent image without distortion was obtained on this rear projection screen.

Example 4

In Example 4, the same projection system and Fresnel lens sheet as those in Example 2 were used, provided that, in Example 4, a Fresnel lens with a pitch of 0.011 cm was formed on a polycarbonate base with a thickness T of 0.45 cm, using an ultraviolet-light-curing resin. The thickness of the UV-curing resin layer was made 0.02 cm.

When these values are substituted in the relationship H×H/(10×E×T×T)≦3L/2000, the left side is equal to 0.11 and the right side is equal to 0.213, as in Example 2, so that this relationship holds.

An excellent image without distortion was produced on the rear projection screen according to Example 4, composed of the above Fresnel lens sheet.

Further, a lenticular lens sheet separate from the above Fresnel lens sheet was placed on the light-emerging side of the above Fresnel lens sheet, thereby obtaining a rear projection screen. The lenticular lens sheet was composed of vertical lenticular lenses with a thickness of 0.1 cm, provided with a pitch of 0.014 cm, and light-absorbing layers containing a light-diffusing agent, provided only on those parts extending along the lens surfaces of the vertical lenticular lenses (peak gain: 4, αH: 25°, αV: 8°). An excellent image without distortion was produced also on this rear projection screen comprising the lenticular lens sheet, which was used as a separate sheet from the Fresnel lens sheet.

Example 5

A rear-projection-type display with a screen size of 70 inches (aspect ratio 4:3, 106.7 cm long by 142.2 cm broad) in which the horizontal distance between a Fresnel lens sheet and a projector (light source) was 32 cm, the vertical distance between the lower end of the screen and the horizontal plane including the projector was 30 cm, and the angle at which imaging light was incident on the center of the screen was 69° was prepared as a rear-projection-type display in which imaging light is obliquely projected from the rear.

For the Fresnel lens sheet was used a Fresnel lens sheet with a thickness of 0.55 cm and a lens pitch of 0.011 cm, obtained by laminating, with an acrylic adhesive, a Fresnel-lens-molded sheet with a thickness of 0.2 cm, made from an acryl-styrene copolymer, to a backing sheet with a thickness of 0.35 cm, made of an acrylic plate.

The production of this Fresnel lens sheet included the step of releasing the Fresnel-lens-molded sheet 13 from such a mold 42 as is shown in FIG. 14. It was fairly easy to conduct this mold releasing operation, and improvement in workablity was thus achieved.

Since the modulus of elasticity of the Fresnel-lens-molded sheet was 33000 kgf/cm$^2$ and that of the backing sheet was 30000 kgf/cm$^2$, the modulus of elasticity of the Fresnel lens sheet was 31500 kgf/cm$^2$, the mean of the above two values. Either the Fresnel-lens-molded sheet or the backing sheet contained no diffusing agent or the like. When these values are substituted in the relationship H×H/(10×E×T×T)≦3L/2000, H×H/(10×E×T×T) is equal to 0.12 and 3L/2000 is equal to 0.213, so that this relationship holds.

An excellent image without distortion was produced on the rear projection screen according to Example 5, composed of the above Fresnel lens sheet. Further, the same lenticular lens sheet as in Example 1 was placed on the light-emerging side of the Fresnel lens sheet, thereby obtaining a rear projection screen. An excellent image without distortion was produced also on the rear projection screen obtained in this manner.

Example 6

In Example 6, the same projection system as in Example 2 and a Fresnel lens sheet with the same thickness (0.45 cm) as that of the Fresnel lens sheet used in Example 2 were used. The Fresnel lens sheet used in Example 6 was one obtained by laminating, with a transparent acrylic pressure-sensitive adhesive, a Fresnel-lens-molded sheet with a thickness of 0.2 cm, made from polycarbonate, to a backing sheet with a thickness of 0.25 cm, made from the same polycarbonate.

The production of this Fresnel lens sheet included the step of releasing the Fresnel-lens-molded sheet 13 from such a mold 42 as is shown in FIG. 14. It was fairly easy to conduct this mold releasing operation, and improvement in workablity was thus achieved. Moreover, since the Fresnel-lens-molded sheet and the backing sheet were made from the same material, the Fresnel lens sheet was hardly affected by environmental changes, and its flatness was not lowered.

Since the material for the Fresnel-lens-molded sheet and that for the backing sheet were the same, the modulus of elasticity of the Fresnel lens sheet was 25000 kgf/cm$^2$, the same value as in Example 2. Therefore, the left side of the relationship H×H /(10×E×T×T)≦3L/2000 is equal to 0.11 and the right side is equal to 0.213, as in Example 2, so that this relationship holds.

An excellent image without distortion was produced on the rear projection-screen according to Example 6, composed of the above Fresnel lens sheet. Further, a lenticular lens sheet was placed on the light-emerging side of the Fresnel lens sheet, as in Example 2, thereby obtaining a rear projection screen. The lenticular lens sheet used in Example 6 was one that contained a diffusing agent in such an amount that the half angle (αV) obtained from the diffusion characteristics graph would be 10°, and also a light-absorbing agent in such an amount that the transmittance would be 50%. An excellent image without distortion was produced also on the rear projection screen obtained in this manner.

Example 7

In Example 7, the same projection system and Fresnel lens sheet as those in Example 1 were used, provided that, in Example 7, a Fresnel-lens-molded sheet with a thickness of 0.02 cm and a lens pitch of 0.011 cm was formed, by the use of an ultraviolet-light-curing resin, on a polyester base with a thickness T of 0.025 cm, and that this Fresnel-lens-molded sheet was laminated, with an acrylic adhesive, to a backing sheet made of a glass plate with a thickness of 0.2 cm.

The production of this Fresnel lens sheet included the step of releasing the Fresnel-lens-molded sheet 13 from such a mold 42 as is shown in FIG. 14. It was fairly easy to conduct this mold releasing operation, and improvement in workablity was thus achieved.

The modulus of elasticity of the Fresnel lens sheet was 700000 kgf/cm$^2$. The thickness of the glass plate serving as the backing sheet was more than 80% of the total thickness of the Fresnel lens sheet, and, moreover, the glass plate contained no diffusing agent, so that the modulus of elasticity of the glass plate was taken as the modulus of elasticity of the Fresnel lens sheet. Therefore, in the relationship H×H/(10×E×T×T)≦3L/2000, H×H/(10×E×T×T) is equal to 0.0139 and 3L/2000 is equal to 0.166, so that this relationship holds.

An excellent image without distortion was produced on the rear projection screen according to Example 7, composed of the above Fresnel lens sheet. Further, the same lenticular lens sheet as in Example 1 was placed on the light-emerging side of the Fresnel lens sheet, thereby obtaining a rear projection screen. An excellent image without distortion was produced also on the rear projection screen obtained in this manner.

Comparative Example 1

In Comparative Example 1, the same projection system and Fresnel lens sheet as those in Example 1 were used, provided that the thickness T of the Fresnel lens sheet was made 0.2 cm.

In the case of the Fresnel lens sheet, H×H/(10×E×T×T) =0.323 and 3L/2000=0.166. Thus, the Fresnel lens sheet did not fulfill the relationship H×H/(10×E×T×T)≦3L/2000.

The image produced on the rear projection screen according to Comparative Example 1, composed of the above Fresnel lens sheet, was found distorted, and an excellent image was never produced on this rear projection screen.

Comparative Example 2

In Comparative Example 2 were used the same projection system as in Example 2 and a Fresnel lens sheet obtained by forming, on a polyester base with a thickness T of 0.25 cm, a Fresnel lens with a thickness of 0.02 cm and a pitch of 0.011 cm, using an ultraviolet-light-curing resin.

In the case of this Fresnel lens sheet, H×H/(10×E×T×T) =0.357 and 3L/2000=0.213. Thus, the Fresnel lens sheet did not fulfill the relationship H×H/(10×E×T×T)≦3L/2000.

The image produced on the rear projection screen according to Comparative Example 2, composed of the above Fresnel lens sheet, was found distorted, and an excellent image was never produced on this rear projection screen.

The invention claimed is:

1. A Fresnel lens sheet comprising unit total reflection Fresnel lenses arranged on a light-entering side, each unit total reflection Fresnel lens having a light-entering surface and a total reflection surface that totally reflects a part of or all of an imaging light that has passed through the light-entering surface to deflect the light in a desired direction, characterized by fulfilling the relationship:

$$H \times H/(10 \times E \times T \times T) \leq 3L/2000,$$

where H represents a length (cm) in a vertical direction of the Fresnel lens sheet; L, a length (cm) in a horizontal direction of the Fresnel lens sheet; T, a thickness (cm) of the Fresnel lens sheet; and E, a modulus of elasticity (kgf/cm$^2$) of the Fresnel lens sheet.

2. The Fresnel lens sheet according to claim 1, characterized in that the Fresnel lens sheet comprises a base, and a Fresnel lens element, provided on the base, the Fresnel lens element including the unit total reflection Fresnel lenses.

3. The Fresnel lens sheet according to claim 1, characterized in that the Fresnel lens sheet comprises a Fresnel-lens-molded sheet having the unit total reflection Fresnel lenses, and a backing sheet laminated to a light-emerging surface of the Fresnel-lens-molded sheet.

4. The Fresnel lens sheet according to claim 3, characterized in that the backing sheet is a lenticular lens sheet having lenticular lenses.

5. The Fresnel lens sheet according to claim 3, characterized in that the Fresnel-lens-molded sheet and the backing sheet are made from a same material.

6. The Fresnel lens sheet according to claim 1, characterized in that the Fresnel lens sheet comprises a light-diffusing agent for diffusing light.

7. The Fresnel lens sheet according to claim 1, characterized in that the Fresnel lens sheet is colored so that it absorbs light.

8. The Fresnel lens sheet according to claim 1, characterized in that the Fresnel lens sheet comprises a light-absorbing layer that absorbs light.

9. The Fresnel lens sheet according to claim 1, characterized in that a reflectance-lowering layer for lowering reflectance is formed on one surface or both surfaces of the Fresnel lens sheet.

10. A rear projection screen comprising a Fresnel lens sheet according to claim 1.

11. A rear-projection-type display characterized by comprising:
   a rear projection screen according to claim 10; and
   a light source from which imaging light is obliquely incident on the rear projection screen.

12. A rear projection screen characterized by comprising:
   a Fresnel lens sheet according to claim 1; and
   lenticular lenses for diffusing light, formed on a light-emerging surface of the Fresnel lens sheet.

13. The rear projection screen according to claim 12, characterized in that a reflectance-lowering layer for lowering reflectance is formed on one surface or both surfaces of the rear projection screen.

14. A rear-projection-type display characterized by comprising:
   a rear projection screen according to claim 12; and
   a light source from which imaging light is obliquely incident on the rear projection screen.

15. A rear projection screen characterized by comprising:
   a Fresnel lens sheet according to claim 1; and
   a lenticular lens sheet having lenticular lenses for diffusing light, placed on a light-emerging side of the Fresnel lens sheet.

16. The rear projection screen according to claim 15, characterized in that a reflectance-lowering layer for lowering reflectance is formed on one surface or both surfaces of the rear projection screen.

17. A rear-projection-type display characterized by comprising:
   a rear projection screen according to claim 15; and
   a light source from which imaging light is obliquely incident on the rear projection screen.

\* \* \* \* \*